(12) United States Patent
Voce et al.

(10) Patent No.: US 7,136,360 B2
(45) Date of Patent: Nov. 14, 2006

(54) AVAILABLE-BIT-RATE SERVICE IN AN ASYNCHRONOUS TRANSFER MODE BASED SPACECRAFT NETWORK

(75) Inventors: Daniel Albert Voce, Germantown, MD (US); Faris Riyad Faris, Germantown, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 892 days.

(21) Appl. No.: 09/917,111

(22) Filed: Jul. 27, 2001

(65) Prior Publication Data

US 2002/0080799 A1 Jun. 27, 2002

Related U.S. Application Data

(60) Provisional application No. 60/222,358, filed on Aug. 1, 2000.

(51) Int. Cl.
*H04B 7/00* (2006.01)
(52) U.S. Cl. .............................. 370/310.1; 370/236.1; 370/316; 370/395.43
(58) Field of Classification Search ................ 370/229, 370/232, 236, 236.1, 236.2, 235, 310.1, 316, 370/395.1, 395.43
See application file for complete search history.

(56) References Cited

U.S. PATENT DOCUMENTS 6,445,707 B1 * 9/2002 Iuoras et al. ........... 370/395.43
2002/0003776 A1 * 1/2002 Gokhale et al. ............ 370/236

* cited by examiner

*Primary Examiner*—Wellington Chin
*Assistant Examiner*—Steven A Blount
(74) *Attorney, Agent, or Firm*—Duane Morris, LLP

(57) ABSTRACT

Asynchronous Transfer Mode (ATM) data is transmitted in Available Bit Rate (ABR) service over a network path including a spacecraft. The spacecraft payload switches do not provide an indication of congestion, so conventional ABR feedback control using Resource Management cells is ineffective. In one avatar of the invention, the Network Control Center coacting with the spacecraft produces signals representative of congestion in services other than ATM ABR service, and these congestion signals are coupled to the terrestrial source terminal, where return or back Resource Management cells are modified with data derived from the congestion signals, to close a feedback loop including the source of ATM ABR signals, the source terminal, and the spacecraft. The feedback loop tends to maintain excess bandwidth in use for ABR purposes, and tends to prevent congestion. In another embodiment, congestion information derived from locations downstream of the spacecraft are coupled in the upstream direction, through the spacecraft, by way of return RM cells. The spacecraft congestion information is combined with the upstream RM cell information and flows to the source of ABR service ATM data.

6 Claims, 4 Drawing Sheets

AVAILABLE-BIT-RATE SERVICE IN AN ASYNCHRONOUS TRANSFER MODE BASED SPACECRAFT NETWORK

This patent application claims priority of a provisional patent application 60/222,358, filed on or about Aug. 1, 2000 entitled, "An Architecture for Supporting the ABR Service Category in an ATM Based Satellite Network Using Limited Payload Resources", in the names of Daniel Albert Voce and Faris Ryad Faris.

FIELD OF THE INVENTION

This invention relates to transmission of asynchronous transfer mode data signals over a satellite-based network having limited satellite payload resources.

BACKGROUND OF THE INVENTION

There have been various proposals to use Asynchronous Transfer Mode (ATM) as the transfer method to provide a variety of services to end users by satellite or spacecraft networks. ATM is a standardized service, which defines a number of service categories. The service category which is provided to each customer depends upon the quality-of-service agreement with the customer. One of the categories of service is the Available Bit Rate (ABR) service, which provides access to network or transmission path bandwidth which is not used for other services. Naturally, within such a class of service, the available bandwidth may vary substantially from time to time. A measure of quality in ATM service is the number or percentage of data cells which are lost or damaged during transmission. It will be understood that, if the source of ATM signals produces signals having a bandwidth greater than that which can be accommodated within the ABR bandwidth at the time of transmission of the data, some data will be lost or distorted, which is the equivalent of lost. In order to prevent overloading of the ABR-available bandwidth, a feedback scheme is used in ATM ABR service, in which Resource Management cells are interspersed with the data cells at the ATM signal source. According to ATM standards, these Resource management cells follow every 32 data cells. These Resource Management cells have bit locations for aiding in control of the ABR transmission rate, so as to accommodate the currently available bandwidth of the ABR service. At various locations along the ATM transmission path, the various switches through which the data flows can mark the bit locations of the Resource Management cells to indicate the existence of congestion. The Resource Management cells have locations for explicit forward congestion indication (EFCI) marking, for relative rate marking, and for explicit rate marking.

The Explicit Forward Congestion Indication marking bit locations associated with the Resource Management cells are intended to provide backward compatibility with one type of congestion control mechanism in which a switch through which the ATM data passes is capable of setting the state of a header bit which represents, by a first state, the lack of congestion, and the second state represents the existence of congestion. Once set to the "congestion" state, downstream switches do not restore the "no congestion" state. Such information, when fed back to the source of ATM data by a stream of return or back Resource Management (BRM) cells, can be used to repeatedly decrease the data rate, until such time as the back Resource Management cells no longer indicate the existence of congestion. The response of this type of feedback control depends, at least in part, on the length of the transmission path, and the delay occurring before return of the Resource Management cells carrying the congestion information. The Relative Rate marking bit locations associated with Resource Management cells are intended to provide backward compatibility with another type of congestion control mechanism, in which the switch through which the ATM data passes sets a congestion indication (CI) bit and a bit representing an increase or no increase (NI) of the Allowable Cell Rate (ACR). The CI bit is equivalent to the EFCI bit in this convention, and the source of data should decrease its bit rate when the CI bit is set. The NI bit, when set, indicates to the source of data that it should not increase its Available Cell Rate. The explicit rate marking bit of a Resource Management cell specifies the actual ACR that the source should use, although it should be noted that each switch of the system may decrease the indicated rate, depending upon the conditions which it experiences.

While Asynchronous Transfer Mode protocols provide for bandwidth control by setting of one of the various EFCI, CI, and Relative rate bits of the Resource Management cells, existing spacecraft have simple switches which are incapable of setting bandwidth control bits. Because of cost considerations, even new spacecraft may not be equipped with switches which have bandwidth control bit setting capability.

It would be desirable to be able to extend ATM ABR service to spacecraft with simple switches.

SUMMARY OF THE INVENTION

A method according to an aspect of the invention is for operating the spacecraft-related portion of an arrangement for transmitting Asynchronous Transfer Mode (ATM) data in Available Bit Rate service over a transmission path including a spacecraft, where the spacecraft includes transmission path ATM data routing switches which lack capability for marking Resource Management cells with congestion information. In the Available-Bit-Rate operating mode, data is transmitted over the transmission path in bandwidth which is otherwise unused by services other than Asynchronous Transfer Mode data Available Bit Rate services. The method according to the invention includes the step, at a source terminal which transmits the Available Bit Rate service Asynchronous Transfer Mode data to the spacecraft, of receiving from a "remote" source Available Bit Rate service Asynchronous Transfer Mode data including Resource Management cells, and deleting the Resource Management cells from the stream of Asynchronous Transfer Mode data in ABR service flowing to the spacecraft, so as to reduce the amount of superfluous data flowing in an ABR bandwidth portion of the spacecraft resources. The method also includes the step of determining, by means other than by use of the Resource Management cells, at least the presence or absence of congestion in the spacecraft payload in paths associated with the Available Bit Rate service Asynchronous Transfer Mode data, to thereby produce spacecraft-congestion-related signals. The spacecraft-congestion-related signals are coupled by way of at least a downlink to the source terminal. At the source terminal, information derived from the spacecraft-congestion-related signals is used to mark back Resource Management cells for return to the source.

A method for operating at least the spacecraft-related portion of a spacecraft data network for Available Bit Rate service Asynchronous Transfer Mode data according to another aspect of the invention is for a situation in which routing switches of the spacecraft are not used for marking the data stream with congestion information. The method comprises the step of, at a source terminal, receiving the Available Bit Rate service Asynchronous Transfer Mode data, and transmitting the Available Bit Rate service Asynchronous Transfer Mode data, together with its Resource Management cells, to a destination terminal by way of the spacecraft. As a consequence, or whereby, the Resource Management cells of the Available Bit Rate service Asynchronous Transfer Mode data arriving at the destination terminal do not carry spacecraft congestion information relating specifically to the Available Bit Rate service Asynchronous Transfer Mode data. The method includes the step of determining spacecraft payload congestion attributable to a plurality of services, including at least one service other than the Available Bit Rate service Asynchronous Transfer Mode data, to thereby generate payload congestion signals. The payload congestion signals are transmitted to the source terminal. At the source terminal, the Resource Management cells of the Available Bit Rate service Asynchronous Transfer Mode data are controllably marked with information derived from said payload congestion signals.

An arrangement according to an aspect of the invention is for transmitting Asynchronous Transfer Mode (ATM) data over a transmission path including a spacecraft in an Available-Bit-Rate (ABR) operating mode. The Available-Bit-Rate operating mode is one in which data is transmitted over the transmission path in bandwidth otherwise unused by services other than the Asynchronous Transfer Mode ABR data. The arrangement includes a source of Asynchronous Transfer Mode data which generates Resource Management cells and combines the Resource Management cells with information data to form the Asynchronous Transfer Mode data to be transmitted, and which is responsive to congestion-indicative information contained within returned Resource Management cells for adjusting the transmission rate of at least the Asynchronous Transfer Mode data. The transmission rate of the Asynchronous Transfer Mode data is adjusted to tend to maintain in use the bandwidth which would otherwise be unused by other services, while tending to avoid congestion which might otherwise result in loss of Asynchronous Transfer Mode data cells. The arrangement also includes a spacecraft including transmission data path switches which do not, or possibly cannot, mark Resource Management cells with congestion information, and a terrestrial Network Control Center communicating with the spacecraft. The Network Control Center co-acts with the spacecraft to determine the level of congestion in at least one service other than the Asynchronous Transfer Mode data Available-Bit-Rate service, and to tend to control the congestion in that at least one service other than Asynchronous Transfer Mode data Available-Bit-Rate service. The coaction between the spacecraft and the Network Control Center for this purpose is by means of payload congestion control signals flowing between the Network Control Center and the spacecraft over a path including an uplink and a downlink. The arrangement also includes a terrestrial spacecraft source terminal coupled to receive Asynchronous Transfer Mode data from the source of Asynchronous Transfer Mode data, and communicating, by means of uplinks and downlinks, with the spacecraft. The spacecraft source terminal is arranged for receiving Resource Management cells associated with the Asynchronous Transfer Mode data, and for marking the Resource Management cells in locations associated with the Resource Management cells which are indicative of at least the presence or absence of congestion, and of returning the Resource Management cells, so marked, toward the source of Asynchronous Transfer Mode data, in the form of return or back Resource Management cells, and also being arranged for transmitting at least the Asynchronous Transfer Mode data to the spacecraft over an uplink. The arrangement further includes receiving means located at the terrestrial spacecraft source terminal for receiving the payload congestion control signals, and for marking the Resource Management cells with payload congestion information derived from the payload congestion control signals originating from the Network Control Center. This closes a control loop including the source of Asynchronous Transfer Mode data, the terrestrial spacecraft source terminal, and the spacecraft, whereby, or as a result of which, congestion of the Asynchronous Transfer Mode data tends to be controlled in that portion of the transmission path including the source of Asynchronous Transfer Mode data, the terrestrial spacecraft source terminal, and the spacecraft.

In a particular version, the arrangement according to an aspect of the invention further includes cell deleting means at the terrestrial spacecraft source terminal for deleting at least some of the Resource Management cells from the Asynchronous Transfer Mode data transmitted over the uplink to the spacecraft, and in this particular version a terrestrial destination terminal is coupled to the spacecraft by another path including uplinks and downlinks. The terrestrial destination terminal includes means for adding forward Resource Management cells to the Asynchronous Transfer Mode data, and for receiving returned resource management cells from downstream locations, for thereby spoofing downstream locations which expect to receive Resource Management cells during Asynchronous Transfer Mode data operation. In another avatar of the particular version, the coaction of the spacecraft and terrestrial Network Control Center to determine the level of congestion in the at least one service other than the ABR Asynchronous Transfer Mode data in Available Bit Rate service produces a signal explicitly representative of payload congestion.

In another particular arrangement, the Resource Management cells associated with the Available Bit Rate service Asynchronous Transfer Mode data are transmitted from the source terminal to a destination terminal by way of the spacecraft. In this other particular arrangement, the destination terminal transmits the Available Bit Rate service Asynchronous Transfer Mode data, together with the associated Resource Management cells, both of which are received from the spacecraft, to locations downstream of the destination terminal, and back Resource Management cells arriving at the destination terminal from the downstream locations are transmitted to the source terminal by way of the spacecraft. This other particular arrangement further includes congestion information marking means located at the source terminal, for receiving the back Resource Management cells, and for controllably marking the back Resource Management cells with information derived from the payload congestion information. This controllable marking may include simply marking the cell with information selected to represent the worst of the two levels of congestion, or it may be simply EFCI marking if either the payload or the downstream locations indicate congestion, relative rate marking based on the worst of the two congestions, if known, or explicit forward rate marking at the lesser of the two rates, if known. This marking by the source terminal is so that Resource Management cells returning toward the source of Available Bit Rate service Asynchronous Transfer Mode data include data for controlling the cell rate of the Available Bit Rate service Asynchronous Transfer Mode data generated by the source of Available Bit Rate service Asynchronous Transfer Mode data, for tending to control at least one of congestion at the spacecraft and at other locations of the transmission path.

DESCRIPTION OF THE INVENTION

Figure 1:
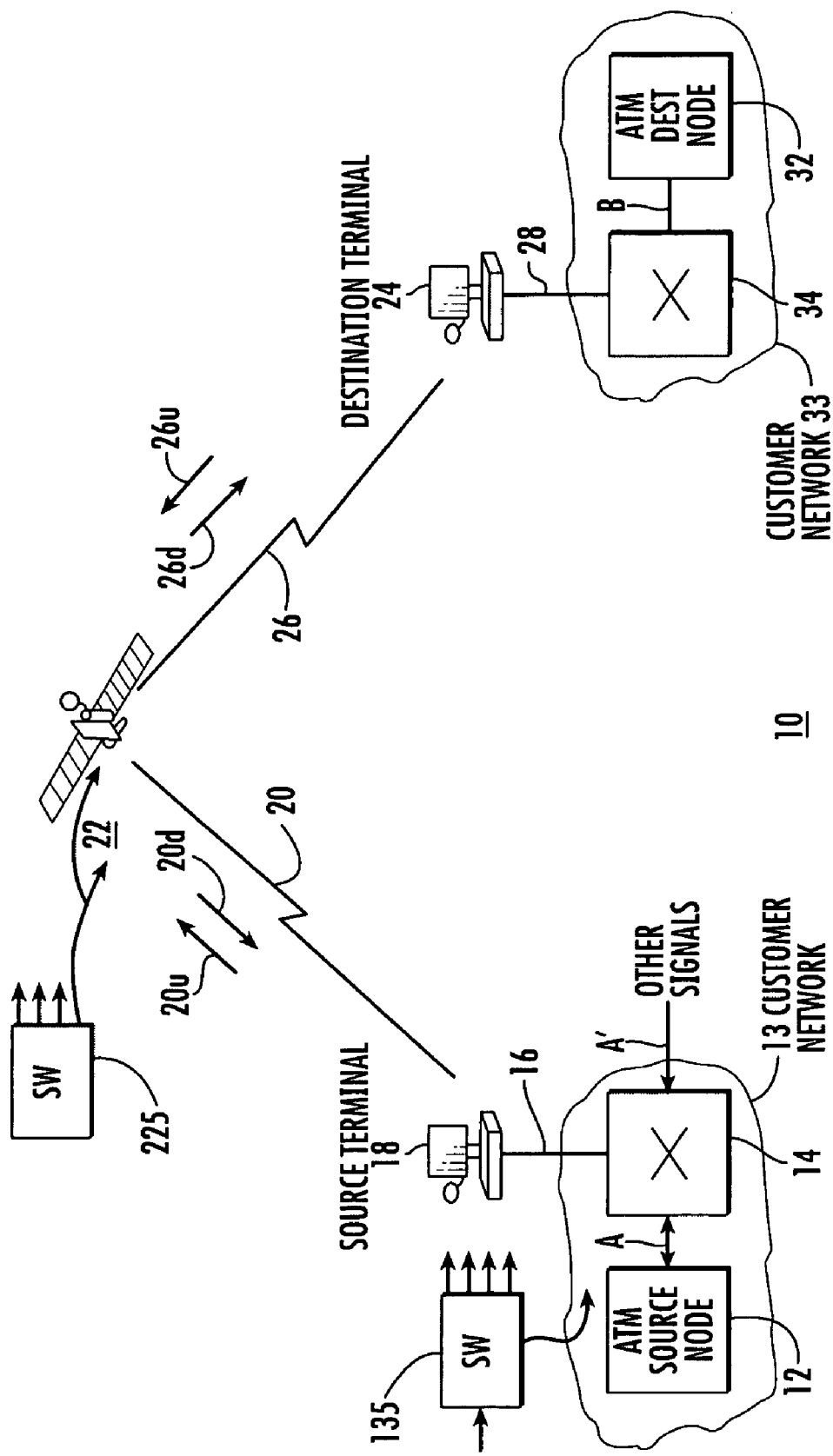
FIG. 1 is a simplified block diagram of a prior-art arrangement for transmitting Asynchronous Transfer Mode signals over a transmission path including a spacecraft.

FIG. 1 represents a proposed arrangement or system 10 for providing ATM service over a spacecraft or satellite network. In FIG. 1, system 10 includes a source 12 of data within a customer network 13, which is, by contract, to be transmitted by Available Bit Rate (ABR). Since ABR transmission requires feedback, source 12 produces forward Resource Management cells interspersed with the data cells. Network 13 includes one or more ATM switches, one of which is illustrated as 13s, which forward ATM cells in accordance with information in the headers of the cells. ATM data signals (including the Resource Management cells) are coupled from source 12 to a combining or multiplexing arrangement 14 by way of a path designated A. The ATM data signals, and any other signals of other types which are applied to combiner 14, as by a path A', are coupled by a path illustrated as 16 to a terrestrial source terminal 18. Source terminal 18 includes equipment for communicating by way of uplinks 20u and downlinks 20d, illustrated together as a lightning bolt symbol 20, with a communication spacecraft or satellite 22. Spacecraft 22 also communicates with at least one other terrestrial terminal, namely destination terminal 24, by way of uplinks 26u and downlinks 26d illustrated together as a path 26. Spacecraft 22 routes signals, including the ATM data ABR service signals received over the uplink portion of path 20, and any other signal requiring routing, to destination terminal 24 by way of a plurality of routing switches, one of which is illustrated as 22s, to the appropriate one(s) of the downlinks associated with path 26. From destination terminal 24, the various downlinked signals are coupled over a path 28 to a splitter or demultiplexer 34, and the ATM data is routed by way of a path designated B to an ATM destination node 32. Source and destination terminals 18 and 24, respectively, may be considered to be "gateway" terminals of a spacecraft communication system.

According to an aspect of the invention, it is noted that the spacecraft communications portions of the transmission system 10 of FIG. 1 are likely to represent the lowest-bandwidth portion of the transmission path, and congestion is therefore more likely to occur at the spacecraft. As noted above, the switches 22s associated with the spacecraft do not have the capability of marking Resource Management cells to indicate the existence of congestion. Thus, source terminal 18 may well transmit additional ATM data signals toward the satellite 22 of FIG. 1 when the satellite switch circuits are already at the limits of their throughput. Ordinarily, each stage of an ATM data path would provide feedback to the preceding stages, and ultimately to the source node 12, to indicate at least the existence or nonexistence of congestion, and preferably to explicitly indicate the data rate at which the source should operate. Since the switches in the spacecraft 22 of FIG. 1 are incapable of providing such feedback, the ATM transmission system 10 including the spacecraft 22 cannot prevent congestion at the location at which congestion is most likely to occur.

Figure 2:
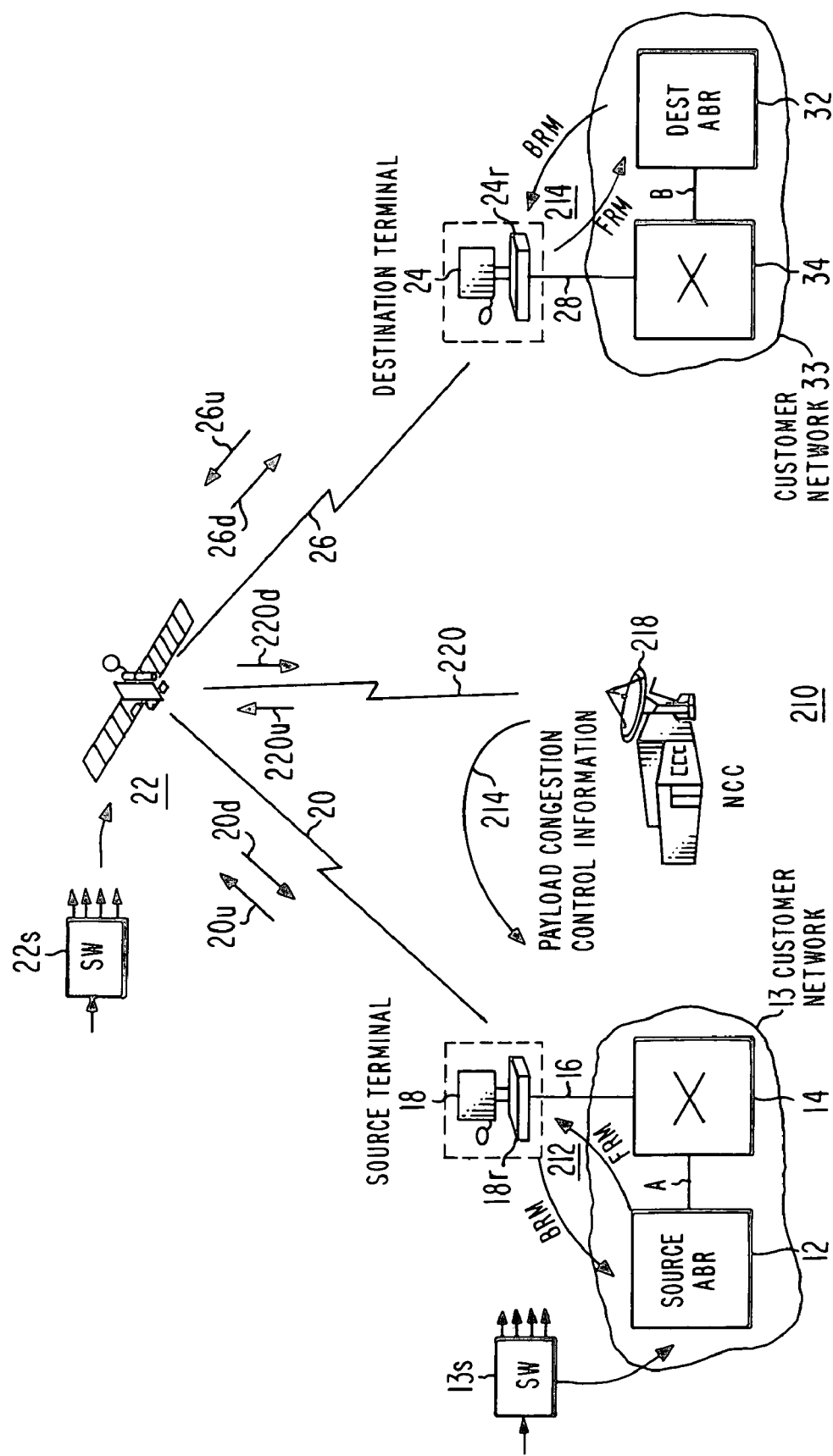
FIG. 2 is a simplified block diagram of an arrangement for the transmission of ABR service ATM data over a spacecraft-based communication system in accordance with an aspect of the invention in which Resource Management cells do not flow through the spacecraft and payload congestion signals are used to control the ABR service ATM data source.

FIG. 2 is a simplified block diagram illustrating a system according to an aspect of the invention. In FIG. 2, elements corresponding to those of FIG. 1 are designated by like reference numerals. In FIG. 2, source terminal 18 is illustrated as being a terminus of a Forward Resource Management (FRM) portion of an ATM congestion control loop designated 212, and a source of return or backward Resource Management (BRM) cells, which together constitute a feedback source rate control loop by which the rate of generation of at least the ATM cells can be controlled. FIG. 2 also illustrates a network control center (NCC) 218, which is either a further terrestrial or ground station independent of gateway(s) of the system, or preferably is associated with a gateway ground station of the system in order to make dual use of the uplink and downlink equipment used to communicate with the spacecraft 22 by way of uplink(s) 220u and downlink(s) 220d, illustrated together by a lightning symbol 220. In any case, NCC 218 of FIG. 2 provides overall control of various aspects of the spacecraft communication system, as known in the art.

The payload of spacecraft 22 of FIG. 2 manages a number of downlink queues, each of which corresponds to one downlink spotbeam, corresponding to one downlink 26d. The payload monitors the status of the queues, and recurrently or periodically (with period N milliseconds) reports the status of the queues to the Network Control Center 218. This status information may be in the form of a statement of the current length of each queue or a statement of the change in length of the queue relative to the previous report, or both. The payload transmits the queue status information over a designated control channel on downlink 220d to the NCC, as a portion of the overall payload status. The status message is preferably encoded for privacy. The NCC 218 of FIG. 2, upon receiving the payload queue status report(s), determines the existence of congestion by at least comparing the stack size with a predetermined reference level, and deeming congestion to exist if the stack size exceeds the threshold. Thus, a payload-congestion-representative signal is generated by the NCC 218. If a particular queue has been deemed to be congested, the NCC notifies (by way of uplinks and downlinks illustrated as a path 214) at least the source terminals associated with the congested queue. Preferably, the notification is by way of a broadcast message over the control channels. When a broadcast message is used for communication, the message identifies the affected source terminals, so that other source terminals need not take any action. The broadcast portions of the control channel(s) may be, and preferably are, protected by proprietary encoding or encryption. Thus, the NCC has payload congestion information available to it, and this information is made available to the various source terminals.

According to an aspect of the invention, the source terminal 18 of FIG. 2, together with its ancillary portions, such as receiver 18r (source terminal 18), performs a plurality of functions in addition to transmission and reception of information by way of uplinks and downlinks 20. More particularly, source terminal 18 deletes from the flow of cells associated with the ATM ABR service and which are uplinked to the spacecraft those cells associated with Resource Management. This has the advantage, in the first instance, of eliminating or preventing transmission of cells which can provide no function as to the spacecraft, since the spacecraft ATM switches cannot use them for congestion indication. This also has the advantage of reducing the transmitted data by $\frac{1}{32}$, corresponding to slightly more than 3%, and so effectively increasing the data rate of the spacecraft ABR portion by 3% as to ATM. In addition, source terminal 18 of FIG. 2 obtains payload congestion information from the NCC by way of the spacecraft, and couples the information into back Resource Management cells which are returned from source terminal 18 to the source 12 of ATM ABR data signals. Such coupling of the information is well within ordinary skill in the art, and involves only "translation" of some sort of the data from one format to another, together with coupling of the information to the appropriate cells, namely the back RM cells. The nature of this portion of the system will depend upon the exact nature and content of the signals, but should be readily accomplished. The back RM cells, with their associated congestion information, are returned to the source 12 of ATM ABR signals, which adjusts its rate in accordance with known ATM ABR techniques.

In FIG. 2, the Resource Management cells associated with the Available Bit Rate service Asynchronous Transfer Mode data do not arrive at destination terminal 24, because they were not transmitted by source terminal 18. Consequently, those portions of the ABR service ATM data paths downstream from destination terminal 24 do not receive the Resource Management cells which they expect for this type of service. Consequently, the downstream portion of the transmission path, including receiver 24r if appropriate, path 28, splitter 34, path B, and destination node 32, may not function properly. It should be noted that path B of FIG. 2 may include additional nodes which are not illustrated, and proper operation of such nodes is also at risk in the absence of RM cells. According to an aspect of the invention, a receiver portion 24r of destination terminal 24 generates Resource Management cells, and adds the RM cells to the flow of data cells derived from the ABR service ATM data, to thus generate a forward flow of alternating data and RM cells in accordance with ABR service ATM data corresponding to the standard. In effect, this forward flow is of ATM data with "synthetic" ABR service RM cells. When the forward RM cells so added reach destination node 32, the destination node generates back Resource Management cells indicating the existence of any possible congestion occurring in that portion of the downstream path following the insertion of the synthetic RM cells. These back RM cells flow back through path B of FIG. 2, until they arrive at destination terminal 24 (or its receiver 24r). At that point, they are simply discarded as having no use, since the rate of flow of ABR service ATM data viewed as arriving from the spacecraft cannot be modified. In effect, the destination node is "spoofed" into believing that it has control over the source rate, as in a conventional ABR ATM system. Thus, the arrangement of FIG. 2, operating in accordance with one or more aspects of the invention, allows efficient ABR service for ATM signals, in the absence of ATM switches which are capable of signaling their state of congestion.

Figure 3:
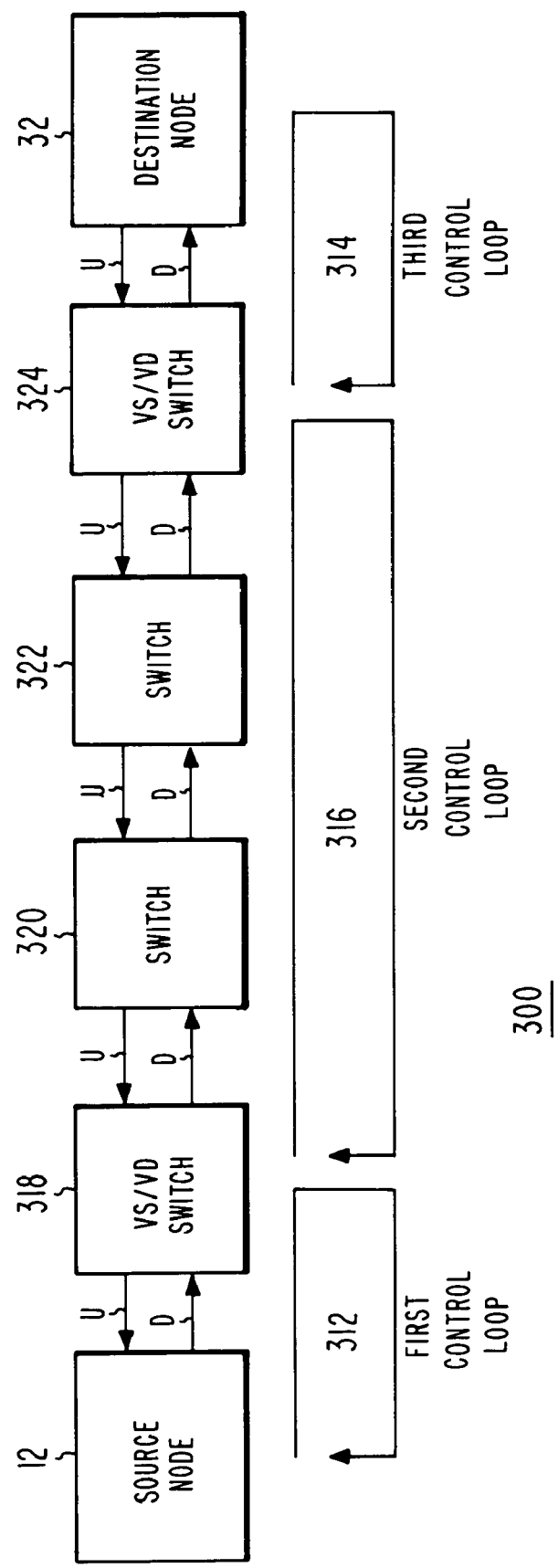
FIG. 3 is a simplified block diagram of a prior-art scheme for control of ABR service ATM data rate by breaking the transmission path into individually controlled segments separated by VS/VD switches.

FIG. 3 is a simplified block diagram of a prior-art transmission path 300 for the propagation of ABR service ATM signals, with closed-loop feedback control broken into portions, of the complete transmission path for rapid response. In FIG. 3, transmission path 300 includes source node 12, which produces Available Bit Rate service Asynchronous Transfer Mode data signals, which include downstream or forward Resource Management cells. This ABR service ATM data flows downstream (D or toward the right in FIG. 3) to a routing switch 318, which is indicated as being a Virtual-Source/Virtual-Destination (VS/VD) switch. The VS/VD switch, unlike the standard switch for ABR service ATM data signals, acts as a destination node as to downstream forward Resource Management cells (that is, as to forward Resource Management cells arriving from upstream), and as a source node as to downstream locations, in that it produces forward Resource Management cells for downstream propagation. In addition, the VS/VD switch acts as a source node as to upstream (U paths, directed toward the left in FIG. 3) reverse or back Resource Management cells, and as a destination node as to upstream or back Resource Management cells. More particularly, taking VS/VD switch 318 of FIG. 3 as an example, VS/VD switch 318, in addition to routing the ATM signal cells of the downstream ABR service ATM data signals according to their header information, also acts as a destination as to the downstream forward Resource Management cells accompanying the downstream information. That is, the VS/VD switch 318 extracts or reads the congestion information accompanying the Resource Management cells, and couples the same, or equivalent, information onto upstream-directed back Resource Management cells, which return in the upstream direction U back toward the source node 12. This closes a feedback loop designated as 312 in FIG. 1, which is very short relative to the entire transmission path 300, and which therefore responds relatively quickly to congestion occurring in the first control loop 312. It should be understood that additional switches, not explicitly illustrated, may exist within control loop 312.

Similarly, the downstream ABR service ATM data signals flowing to the right from VS/VD switch 318 of FIG. 3 pass successively through two standard routing switches designated 320 and 322, which sense congestion (if any) at their locations, and respond by imposing congestion-related information onto the forward Resource Management cells flowing therethrough in conjunction with the ABR service ATM data cells. When these forward Resource Management cells arrive at Virtual-Source/Virtual-Destination switch 324, it reads the cumulative congestion information associated with the forward-direction Resource Management cells, and makes its own determination of congestion at its own site or location, and couples the combined information onto reverse or back Resource Management cells, which propagate in the upstream direction from VS/VD switch 324 back through switches 322 and 320, and through VS/VD switch 318. Thus, the return Resource Management cells leaving VS/VD switch 322 in the upstream direction, which arrive at VS/VD switch 318, include information about congestion which exists or has occurred in switches 320, 322, and 324, or in other words in second control loop 316. As with control loop 312, control loop 316 may include switches in addition to switches 320 and 322. VS/VD switch 318 adds to, or imposes on, the congestion information on the return or back Resource Management cells its own assessment of the congestion occurring in first control loop 312, so that the back Resource Management cells reflect the congestion in both loops 312 and 316. VS/VD switch 318 sends the return Resource Management cells upstream toward source 12.

In much the same manner, downstream forward Resource Management cells accompanying the Available Bit Rate service Asynchronous Transfer Mode data signals as they flow downstream toward the destination mode 32 are marked with congestion information at any intervening switches (none illustrated) and also by the destination node. The destination node 32 produces upstream-directed back Resource Management cells which propagate upstream to VS/VD switch 324, thereby closing a third control loop 314. VS/VD switch 324 modifies the congestion information contained within the upstream-directed back Resource Management cells (if necessary) with information relating to the cumulative congestion within control loop 316, and sends the resulting modified back Resource Management cells onward in the upstream direction toward the source node 12. In this fashion, congestion at locations lying between the source node 12 and the ultimate destination node 32 can be reported back to the source node 12 within a time shorter than that required for the Resource Management cells to traverse the entire length of the transmission path, from source 12 to ultimate destination 32, in both the downstream and upstream directions.

It should be noted that if the Virtual-Source/Virtual-Destination switches, illustrated as 318 and 324 of FIG. 3, have their own memory or storage, then more positive control of the loop immediately downstream from such a VS/VD switch can be established.

Figure 4:
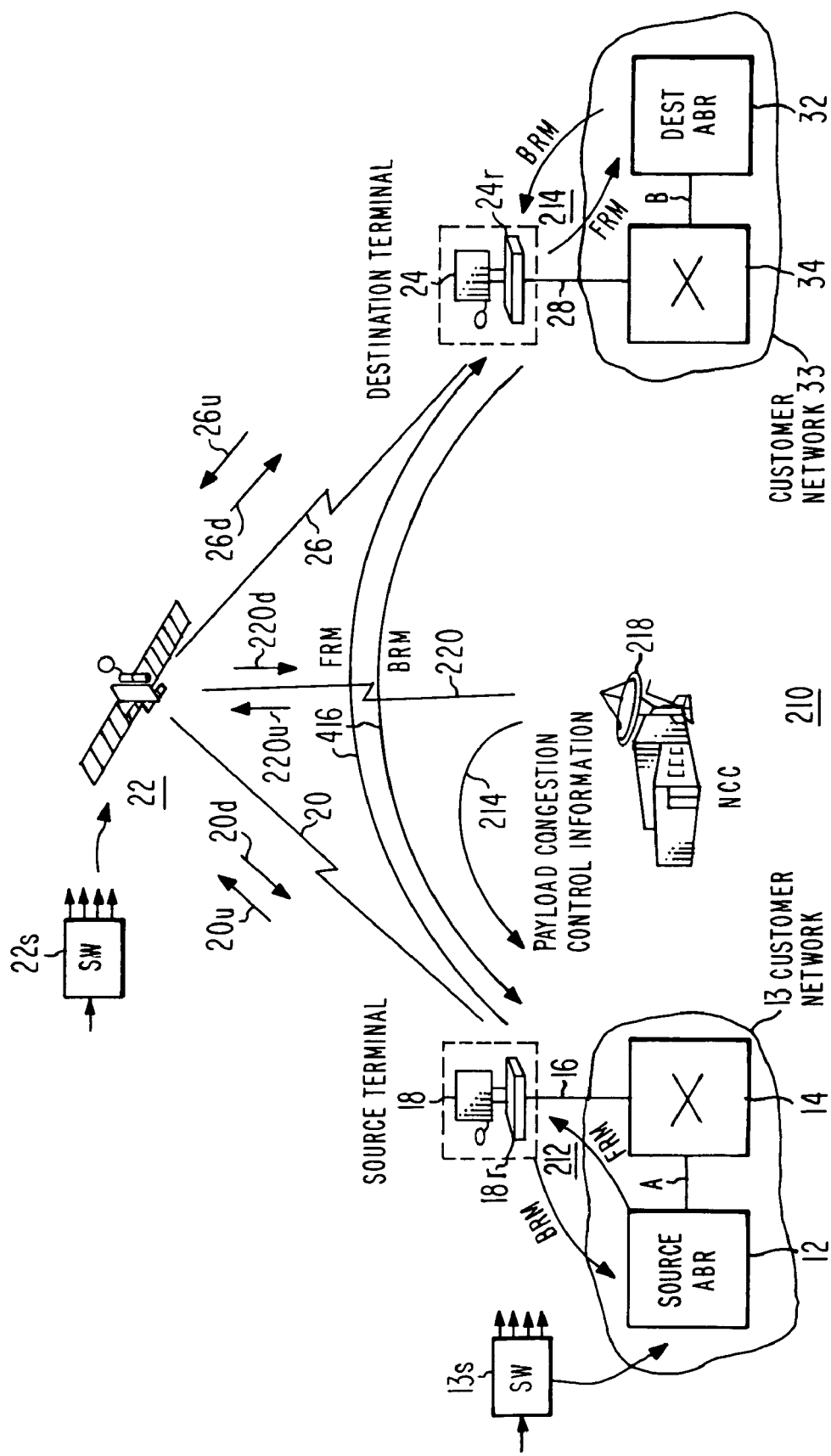
FIG. 4 is a simplified block diagram of an arrangement for the transmission of ABR service ATM data over a spacecraft-based communication system in accordance with an aspect of the invention in the transmission path is broken into segments, and in which Resource Management cells flow through the spacecraft and payload congestion signals, together with the Resource Management cell information from downstream of the spacecraft, are used to control the ABR service ATM data source.

FIG. 4 is similar to FIG. 2, and corresponding elements of FIG. 4 are given the same designations as in FIG. 2. The FIG. 4 arrangement uses VS/VD switches at at least the source terminal 18, so as to break the entire transmission path extending from source 12 to destination node 32 into smaller control segments. In the arrangement of FIG. 4, the source terminal 18 receives Available Bit Rate service Asynchronous Transfer Mode data as in the case of FIG. 2, and sends the data cells on toward the spacecraft 22 over uplink 20u as in FIG. 2. However, instead of deleting the Resource Management cells associated with the ABR service ATM data, the source terminal 18 sends the Resource Management cells on toward the spacecraft in their normal locations within the data stream. Thus, the ABM service ATM data flows through the spacecraft and its switches 22s. As mentioned, however, the switches 22s of the spacecraft 22 are not capable of, or are not commanded to, determine congestion and mark the Resource Management cells of the ABR service ATM data. Thus, the forward RM cells and the data cells of the ABR service ATM data arrive at the destination terminal 24. There is no need to synthesize forward Resource Management cells as in the case of the arrangement of FIG. 2, so destination terminal 24 and its receiver 24r simply pass along the flow of ABR service ATM data, through splitter 34 and path B to destination node 32 of customer network 33. It should be particularly noted that the RM cells arriving at destination node 32 do not include any congestion information attributable to congestion at the switches 22s of the spacecraft 22. At the destination node 32, the congestion information derived from the Resource Management cells is processed in the conventional manner, and incorporated into back RM cells. Since the forward RM cells did not include information relating to congestion within the spacecraft, the back RM cells also cannot contain any information relating thereto. The back RM cells are returned from destination node 32 through path B and splitter 34 to destination node 24 for transmission back through the spacecraft to source terminal 18. At source terminal 18, additional data or information is available which relates to the congestion state of the spacecraft payload, as described in conjunction with FIG. 2. According to an aspect of the invention, the source terminal 18 includes what amounts to a VS/VD function, so as to break the transmission path extending from source node 12 to destination node 32 into at least two distinct portions. The information relating to the congestion state of the spacecraft payload, which is available at source terminal 18 could simply be added to or incorporated within the forward RM cells as they pass in the upstream through the source terminal 18. The addition of the payload congestion information to the upstream-directed back Resource Management cells in source terminal 18 in this manner is precisely analogous to the addition of congestion information determined at VS/VD switch 318 of FIG. 3 to the upstream-directed back Resource Management cells passing therethrough. Thus, the function of addition of the payload information to the upstream-directed back RM cells in source terminal 18 of FIG. 4 is essentially known in the prior art. The only difference may lie in the requirement for translating the payload congestion information into forms recognizable by the ATM source node 12.

According to another aspect of the invention, the destination terminal 24 of FIG. 4 is also operated in an equivalent VS/VD mode. In this case, the manner of operation is explicitly identical to that described in conjunction with VS/VD switch 324 of FIG. 3. That is, the destination terminal 24 of FIG. 4 marks RM cells according to congestion on its terrestrial interface toward the destination node.

In effect, the operation of the ABR service ATM data transmission path 400 of FIG. 4 in the described manner divides the associated transmission path extending from source node 12 to destination node 32 into three control portions, namely control portion 212, control portion 416, and control portion 214. The control loops 212 and 214 at each end of the transmission path of FIG. 4 are conventional ABR service ATM data control loops, while the central control loop, namely loop 416, is equivalent to the conventional control loop, but differs in that it simply converts the spacecraft payload congestion information into information in a form useful for the reverse RM cells, and "combines" the payload information with the congestion information already in the reverse RM cells.

Other embodiments of the invention will be apparent to those skilled in the art. For example, while the deletion of RM cells from the uplinked information has been attributed to source terminal 18, the function could be performed in some equipment upstream of the source terminal, if desired. Those skilled in the art know that controls such as those described are implemented chiefly in software, and the names of the specific functions can be selected at will; consequently, while the various signals and controls have been given specific names, the names are essentially arbitrary, and can be amended at will. While the determination of payload congestion as made by the spacecraft 22 in conjunction with the Network Control Center 218 may be based on the amount of data in one or more queues, and some of that data will include ABR service ATM data, the NCC looks on that portion of the data as simply additional data, and bases its determination of congestion on the total amount of data, regardless of the service with which the data is associated.

Thus, a method according to an aspect of the invention is for operating the spacecraft-related portion (18, 22, 218) of an arrangement (210) for transmitting Available Bit Rate service Asynchronous Transfer Mode (ATM) data over a transmission path (12, A, 14, 16, 18, 20, 22, 26, . . . ) including a spacecraft (22), where the spacecraft (22) includes transmission path ATM data routing switches (22s) which lack capability for marking Resource Management cells with congestion information. In the Available-Bit-Rate operating mode, data is transmitted over the transmission path (12, A, 14, 16, 18, 20, 22, 26, . . . ) in bandwidth which is otherwise unused by services other than Asynchronous Transfer Mode data Available Bit Rate services. The method according to the invention includes the step, at a source terminal (18) which transmits the Available Bit Rate service Asynchronous Transfer Mode data to the spacecraft (22), of receiving from a "remote" source (12, A, 14) Available Bit Rate service Asynchronous Transfer Mode data including Resource Management cells, and deleting the Resource Management cells from the stream of Asynchronous Transfer Mode data in ABR service flowing to the spacecraft (22), so as to reduce the amount of superfluous or unusable data flowing in an ABR bandwidth portion of the spacecraft resources. The method also includes the step of determining, by means (220, 218, 214) other than by use congestion information derived from marking of Resource Management cells by routing switches, at least the presence or absence of congestion in the spacecraft payload in paths associated with the Available Bit Rate service Asynchronous Transfer Mode data, to thereby produce spacecraft-congestion-related signals. The spacecraft-congestion-related signals are coupled by way of at least a downlink (20d) to the source terminal (18). At the source terminal (18), information derived from the spacecraft-congestion-related signals is used to mark back Resource Management cells with congestion information for return to the source (12, A, 14).

A method for operating at least the spacecraft-related portion (18, 22, 24) of a spacecraft data network (12, 14, 18, 22, 24, 34, 32) for Available Bit Rate service Asynchronous Transfer Mode data according to another aspect of the invention is for a situation in which routing switches (22s) of the spacecraft (22l) are incapable of, or are not used for, marking the data stream with congestion information. The method comprises the step of, at a source terminal (18), receiving (from source 12, path A, and combiner 14, and path 16) the Available Bit Rate service Asynchronous Transfer Mode data, and transmitting the Available Bit Rate service Asynchronous Transfer Mode data, together with its Resource Management cells, to a destination terminal (24) by way of the spacecraft (22). As a consequence, or whereby, the Resource Management cells of the Available Bit Rate service Asynchronous Transfer Mode data arriving at the destination terminal (24) do not carry spacecraft congestion information relating specifically to the Available Bit Rate service Asynchronous Transfer Mode data. The method includes the step of determining spacecraft payload congestion attributable to a plurality of services, including at least one service other than the Available Bit Rate service Asynchronous Transfer Mode data, to thereby generate payload congestion signals. Most often, the Available Bit Rate service ATM data will likely be only a small portion of the overall data stream. The payload congestion signals are transmitted to the source terminal (18). At the source terminal (18), the Resource Management cells of the Available Bit Rate service Asynchronous Transfer Mode data are controllably marked with information derived from said payload congestion signals.

An arrangement (210, 410) according to an aspect of the invention is for transmitting Asynchronous Transfer Mode (ATM) data over a transmission path including a spacecraft (22) in an Available-Bit-Rate operating mode. The Available-Bit-Rate operating mode is one in which data is transmitted over the transmission path in bandwidth otherwise unused by other ATM services or by other than Asynchronous Transfer Mode data services. The arrangement (210, 410) includes a source (12) of Available Bit Rate service Asynchronous Transfer Mode data which generates Resource Management cells and combines the Resource Management cells with information data to form the Asynchronous Transfer Mode data to be transmitted, and which is responsive to congestion-indicative information contained within returned Resource Management cells for adjusting the transmission rate of at least the Asynchronous Transfer Mode data. Ordinarily, the source (12) will also adjust the transmission rate of the Resource Management cells. The transmission rate of the Available Bit Rate service Asynchronous Transfer Mode data is adjusted by the source (12) under the control of the congestion information to tend to maintain in use that bandwidth which would otherwise be unused by other services, while tending to avoid congestion which might otherwise result in loss of ABR service Asynchronous Transfer Mode data cells. The arrangement (210, 410) also includes a spacecraft (22) including transmission data path switches (22s) which do not mark Resource Management cells with congestion information, and a terrestrial Network Control Center (218) communicating (by way of paths 220) with the spacecraft (22). The Network Control Center (218) co-acts with the spacecraft (22) to determine the level of congestion in at least one service or groups of services other than the Asynchronous Transfer Mode data Available-Bit-Rate service, and to tend to control the congestion in that at least one service other than Asynchronous Transfer Mode data Available-Bit-Rate service. The coaction between the spacecraft (22) and the Network Control Center (218) for this purpose is by means of payload congestion control signals flowing between the Network Control Center and the spacecraft (22) over a path (220) including an uplink (220u) and a downlink (220d). The arrangement (210, 410) also includes a terrestrial spacecraft (22) source terminal (18) coupled to receive Available Bit Rate service Asynchronous Transfer Mode data from the source (12) of Available Bit Rate service Asynchronous Transfer Mode data, and communicating, by means of uplinks and downlinks (20), with the spacecraft (22). The spacecraft (22) source terminal (18) is arranged for receiving Resource Management cells associated with the Asynchronous Transfer Mode data, and for marking the Resource Management cells in locations associated with the Resource Management cells which are indicative of at least the presence or absence of congestion, and is also capable of returning the Resource Management cells, so marked, toward the source (12) of Asynchronous Transfer Mode data, in the form of back Resource Management cells, and is also arranged for transmitting at least the Asynchronous Transfer Mode data portion of the Available Bit Rate service Asynchronous Transfer Mode data to the spacecraft (22) over an uplink portion of a path (20). The arrangement (210, 410) further includes receiving means (18r) located at the terrestrial spacecraft (22) source terminal (18) for receiving the payload congestion control signals, and for marking the Resource Management cells with payload congestion information derived from the payload congestion control signals originating from the Network Control Center (218). This closes a control loop including the source (12) of Asynchronous Transfer Mode data, the terrestrial spacecraft (22) source terminal (18), and the spacecraft (22), whereby, or as a result of which, congestion of the Asynchronous Transfer Mode data tends to be controlled in that portion of the transmission path including the source (12) of Asynchronous Transfer Mode data, the terrestrial spacecraft (22) source terminal (18), and the spacecraft (22).

In a particular version, the arrangement (210, 410) according to an aspect of the invention further includes cell deleting means (18r) at the terrestrial spacecraft (22) source terminal (18) for deleting the Resource Management cells from the Available Bit Rate Asynchronous Transfer Mode ABR service signals transmitted over the uplink (20u) to the spacecraft (22), and in this particular version a terrestrial destination terminal (24) is coupled to the spacecraft (22) by another path (26) including uplinks (26u) and downlinks (26d), and the terrestrial destination terminal (24) includes means (24r) for adding forward Resource Management cells to the Asynchronous Transfer Mode data portion of the Available Bit Rate service Asynchronous Transfer Mode data, and for receiving back Resource Management cells from downstream locations, for thereby spoofing downstream locations which expect to receive Resource Management cells during Available Bit Rate service Asynchronous Transfer Mode data operation. In another avatar of the particular version, the coaction of the spacecraft (22) and terrestrial Network Control Center (218) to determine the level of congestion in the at least one service other than the Asynchronous Transfer Mode data ABR service produces a signal explicitly representative of payload congestion.

In another arrangement (210, 410) for transmitting Asynchronous Transfer Mode data over a transmission path including a spacecraft (22) according to another aspect of the invention, the transmission is in an Available-Bit-Rate operating mode. In the Available-Bit-Rate operating mode, data is transmitted over the transmission path in bandwidth otherwise unused by services other than the Asynchronous Transfer Mode data Available-Bit-Rate service, or in other words in available bandwidth. This arrangement comprises a source (12) of Available Bit Rate service Asynchronous Transfer Mode data which generates forward Resource Management cells and combines the forward Resource Management cells with the Asynchronous Transfer Mode data to be transmitted. This source (12) is responsive to congestion-indicative information contained within returned Resource Management cells for adjusting the transmission rate of at least the Asynchronous Transfer Mode data, and possibly of the Resource Management cells associated therewith, to tend to maintain in use, for the Available Bit Rate service Asynchronous Transfer Mode data, the bandwidth otherwise unused, while tending to avoid congestion which might otherwise result in loss of Asynchronous Transfer Mode data cells. This arrangement (210, 410) according to this other aspect of the invention includes a spacecraft (22) which is fitted with transmission data path switches (22s) which do not mark Resource Management cells. The spacecraft (22) includes transmission paths (including switches 22s) for information which is used by the services other than the Asynchronous Transfer Mode data ABR service. A terrestrial spacecraft (22) source terminal (18) is for receiving standard Asynchronous Transfer Mode data originating from the source (12) of Available Bit Rate service Asynchronous Transfer Mode data, and for communicating by means of uplinks (20u) and downlinks (20d) with the spacecraft (22). The spacecraft (22) source terminal (18) is arranged for receiving forward Resource Management cells associated with the Available Bit Rate service Asynchronous Transfer Mode data, and is also arranged for transmitting at least the Asynchronous Transfer Mode data, without the Resource Management cells, by way of an uplink (20u) to the spacecraft (22). The spacecraft (22) source terminal (18) is further arranged for receiving Asynchronous Transfer Mode data congestion information, in a format which is other than a standard Asynchronous Transfer Mode data format ABR service, by way of a downlink (20d) from the spacecraft (22), and for returning toward the source of Asynchronous Transfer Mode data Resource Management cells including at least some congestion information derived from the congestion information received by way of the downlink (20d). The arrangement (210, 410) also includes a terrestrial spacecraft (22) destination terminal (24) for communicating with the spacecraft (22) by way of uplinks (26u) and downlinks (26d). The spacecraft (22) destination terminal (24) is for receiving the Asynchronous Transfer Mode data without the Resource Management cells from the spacecraft (22) by way of a downlink (26d), and for generating forward Resource Management cells and associating the forward Resource Management cells so generated with the Asynchronous Transfer Mode data received over the downlink, to thereby form received standard Asynchronous Transfer Mode data. A destination node receives standard Asynchronous Transfer Mode data, and receives the standard forward Asynchronous Transfer Mode data, and also returns toward the terrestrial spacecraft (22) destination terminal (24) back Resource Management cells including congestion information relating to the Asynchronous Transfer Mode data in the path between the spacecraft (22) destination terminal (24) and the destination node.

What is claimed is:

1. A method for operating the spacecraft-related portion of an arrangement for transmitting Available Bit Rate service Asynchronous Transfer Mode (ATM) data over a transmission path including a spacecraft, where the spacecraft includes transmission path ATM data routing switches which lack capability for marking Resource Management cells with congestion information, said transmission being in an Available-Bit-Rate operating mode in which data is transmitted over the transmission path in bandwidth which is otherwise unused by services other than Available Bit Rate service Asynchronous Transfer Mode data, said method comprising the steps of:

at a source terminal which transmits said Available Bit Rate service Asynchronous Transfer Mode data to said spacecraft, receiving from a source node Available Bit Rate service Asynchronous Transfer Mode data including Resource Management cells, and deleting the Resource Management cells from the stream of Available Bit Rate Asynchronous Transfer Mode data flowing to the spacecraft, so as to reduce the amount of superfluous data flowing in an ABR bandwidth portion of the spacecraft resources;

determining at least the presence of absence of congestion in the spacecraft payload in paths associated with said Available Bit Rate service Asynchronous Transfer Mode data by means other than by use of said routing switches, to thereby produce spacecraft-congestion-related signals;

coupling said spacecraft-congestion-related signals by way of at least a downlink to said source terminal; and at said source terminal, using information derived from said spacecraft-congestion-related signals to mark back Resource Management cells for return to said source.

2. An arrangement for transmitting Available Bit Rate service Asynchronous Transfer Mode (ATM) data over a transmission path including a spacecraft, said Available-Bit-Rate operating mode being one in which data is transmitted over the transmission path in bandwidth otherwise unused by services other than said Available Bit Rate service Asynchronous Transfer Mode data, said arrangement comprising:
- a source of Available Bit Rate service Asynchronous Transfer Mode data which generates Resource Management cells and combines said Resource Management cells with information data to form said Available Bit Rate service Asynchronous Transfer Mode data to be transmitted, and which is responsive to congestion-indicative information contained within returned Resource Management cells for adjusting the transmission rate of at least said Asynchronous Transfer Mode data portion of said Available Bit Rate service Asynchronous Transfer Mode data to tend to maintain in use, for said Asynchronous Transfer Mode data, said bandwidth otherwise unused;
- a spacecraft including transmission data path switches which do not mark Resource Management cells with congestion information, and a terrestrial Network Control Center communicating with said spacecraft, said Network Control Center co-acting with said spacecraft to determine the level of congestion in at least one service other than said Available-Bit-Rate service Asynchronous Transfer Mode data, and to tend to control said congestion in said at least one service other than said Available Bit Rate service Asynchronous Transfer Mode data by means of payload congestion control signals transmitted between said spacecraft and said Network Control Center over a signal path including an uplink and a downlink;
- a terrestrial spacecraft source terminal coupled to receive Available Bit Rate service Asynchronous Transfer Mode data from said source of Available Bit Rate service Asynchronous Transfer Mode data, and communicating, by means of uplinks and downlinks, with said spacecraft, said spacecraft source terminal being arranged for receiving Resource Management cells associated with said Available Bit Rate service Asynchronous Transfer Mode data, and for marking said Resource Management cells in locations indicative of at least the presence or absence of congestion, and of returning said Resource Management cells, so marked, toward said source of Available Bit Rate service Asynchronous Transfer Mode data, in the form of back Resource Management cells, and also being arranged for transmitting at least said Asynchronous Transfer Mode data portion of said Available Bit Rate service Asynchronous Transfer Mode data to said spacecraft over an uplink;
- means located at said terrestrial spacecraft source terminal for receiving said payload congestion control signals, and for marking said Resource Management cells with payload congestion information derived from said payload congestion control signals originating from said Network Control Center, thereby closing a control loop including said source of Available Bit Rate service Asynchronous Transfer Mode data, said terrestrial spacecraft source terminal, and said spacecraft, whereby congestion of said Available Bit Rate service Asynchronous Transfer Mode data tends to be controlled in that portion of said transmission path including said source of Available Bit Rate service Asynchronous Transfer Mode data, said terrestrial spacecraft source terminal, and said spacecraft.

3. An arrangement according to claim 2, further comprising:
- means at said terrestrial spacecraft source terminal for deleting at least some of said Resource Management cells from said Asynchronous Transfer Mode data which is transmitted over said uplink to said spacecraft; and
- a terrestrial destination terminal coupled to said spacecraft by uplinks and downlinks, said terrestrial destination terminal including means for adding forward Resource Management cells to Asynchronous Transfer Mode data cells, and for receiving returned resource management cells from downstream locations, for thereby spoofing downstream locations which expect to receive Resource Management cells during Asynchronous Transfer Mode data operation.

4. An arrangement according to claim 2, wherein said coaction of said spacecraft and terrestrial Network Control Center to determine the level of congestion in said at least one service other than said Asynchronous Transfer Mode data Available Bit Rate service produces a signal explicitly representative of payload congestion.

5. An arrangement according to claim 2, wherein said Resource Management cells of said Available Bit Rate service Asynchronous Transfer Mode data are transmitted from said source terminal to a destination terminal by way of said spacecraft, and said destination terminal transmits said Available Bit Rate service Asynchronous Transfer Mode data which are received from said spacecraft to locations downstream of said destination terminal, and wherein back Resource Management cells arriving at said destination terminal are transmitted to said source terminal by way of said spacecraft, said arrangement further comprising;
- congestion information marking means located at said source terminal, for receiving said back Resource Management cells, and for controllably marking said back Resource Management cells with information derived from said payload congestion information, so that Resource Management cells returning toward said source of Available Bit Rate service Asynchronous Transfer Mode data include congestion data for controlling the cell rate of said Available Bit Rate service Asynchronous Transfer Mode data generated by said source of Available Bit Rate service Asynchronous Transfer Mode data for tending to control at least one of congestion at said spacecraft and at other locations of said transmission path.

6. A method for operating at least the spacecraft-related portion of a spacecraft data network for Available Bit Rate service Asynchronous Transfer Mode data, where routing switches of said spacecraft are not used for marking the data stream with congestion information, said method comprising the steps of:
- at a source terminal, receiving said Available Bit Rate service Asynchronous Transfer Mode data, and transmitting said Available Bit Rate service Asynchronous Transfer Mode data, together with its Resource Management cells, to a destination terminal by way of said spacecraft, whereby said Resource Management cells of said Available Bit Rate service Asynchronous Transfer Mode data arriving at said destination terminal do not carry spacecraft congestion information relating specifically to said Available Bit Rate service Asynchronous Transfer Mode data;
- determining spacecraft payload congestion attributable to a plurality of services, including services other than said Available Bit Rate service Asynchronous Transfer Mode data, to thereby generate payload congestion signals;

transmitting said payload congestion signals to said source terminal; and at said source terminal, controllably marking said Resource Management cells of said Available Bit Rate service Asynchronous Transfer Mode data with information derived from said payload congestion signals.

* * * * *